United States Patent Office 3,345,212
Patented Oct. 3, 1967

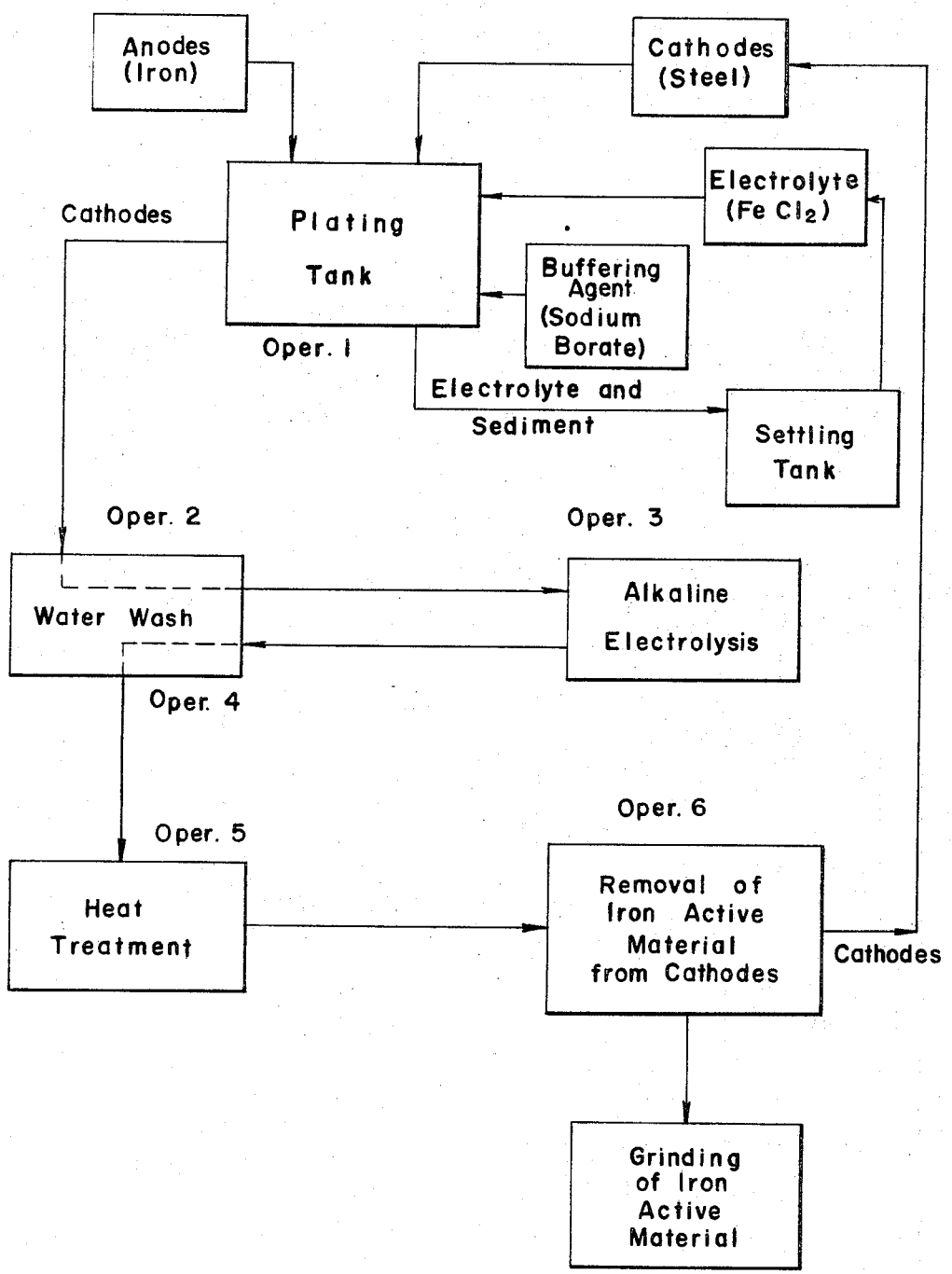

3,345,212
ELECTROLYTIC PROCESS FOR
PREPARING IRON
Edward F. Schweitzer, Philadelphia, Pa., assignor, by mesne assignments, to ESB Incorporated, Philadelphia, Pa., a corporation of Delaware
Filed Feb. 18, 1964, Ser. No. 345,752
6 Claims. (Cl. 136—25)

This invention relates to an electrolytic process for preparing iron. In particular, this invention relates to an electrolytic process for depositing a spongy, non-coherent and soft iron which can be easily ground and processed into an active material for electric storage batteries.

Currently, iron active material for electric storage batteries is prepared by reacting an impure iron with sulfuric acid to form ferrous sulfate which is further treated in about nine different operations to produce a suitable iron active material mix. A good iron active material generally comprises about 50% iron and about 50% iron oxide ($Fe_3O_4$). This chemical process for preparing iron active material is expensive, requires a large operational area, creates a dust and fume pollution problem and requires a large labor force.

At the present time, most of the electrolytic processes which relate to electrorefining, electrowinning or electroplating metals are designed to obtain a coherent, hard and non-porous metallic deposit. Such processes are unsatisfactory for preparing electric storage battery iron active material which should be deposited as a spongy, soft and non-coherent metallic deposit in order that it can be easily removed and processed to battery active material.

It is an object of this invention to provide an electrolytic process for preparing electric storage battery iron active material.

Another object of the invention is to provide an electrolytic process for forming a spongy, soft and non-coherent iron deposit.

A further object of this invention is to provide an electrolytic process for forming a spongy, soft and non-coherent iron deposit which may be deposited at relatively high temperatures.

Other objects and advantages of the electrolytic process of this invention will be apparent to those skilled in the art in view of the following description, and in particular, by reference to the drawing in which:

The drawing is a flow of an electrolytic process for depositing iron in accordance with this invention.

It has been discovered that iron can be deposited on a cathode in a spongy, soft and non-coherent form, suitable for easy removal and processing into an electric storage battery iron active material. It has been found that the general conditions essential for the electrolytic formation of spongy iron deposits on cathodes are (1) a reduction in the concentration of the iron ions in the vicinity of the cathodes during the plating operation, and (2) the presence of precipitated hydroxide in the electrolyte surrounding the cathodes. Conditions which favor a reduction in the concentration of the iron ions are low initial iron concentration in the electrolyte constituting the plating bath, high current density on the cathodes on which plating occurs, restricted agitation of the plating bath, and the presence of a high concentration of a buffering agent in the plating bath. Precipitated hydroxide in the electrolyte is promoted by the use of an electrolyte having a nearly neutral pH and by conditions which favor hydrogen evolution.

The electrolytic process for preparing electric storage battery iron active material in accordance with the invention comprises six principal unit operations. The process can best be described by referring to FIGURE 1 which is a flow diagram of this electrolytic process.

Since the process of this invention is an electrolytic process, it requires electrodes, anodes and cathodes, electrolyte and a source of electric current. Any suitable source of iron which will not unduly contaminate the electrolyte may be used as the anode material. It is generally preferred to use iron sheets as the anodes. The cathodes, upon which the iron is electrolytically deposited, should also be made of a material which will not unduly contaminate the plating bath. In addition, the cathodes should be sufficiently hard and strong to withstand the operation in which the deposited iron is removed from the cathodes by grinding. Though pure iron is the optimum cathode material, A.I.S.I. C-1010 hot-rolled carbon steel bars have been found to be suitable cathodes. The electrodes may be any suitable shape, though cathodes in the shape of rods are particularly preferred because they facilitate the removal and grinding of the deposited iron. The rod-shaped cathodes can be put directly into a rod mill, and the deposited iron can be removed and ground to the proper size in one operation. If conventional sheet cathodes are used, the iron must first be removed and then ground in a separate operation.

The electrolyte used in the electrolytic process of this invention for depositing a spongy, soft iron must contain ferrous ions. In order to obtain a spongy iron deposit, it is essential that the ferrous ion concentration be kept low, with a concentration of about 20 to about 50 grams of iron per liter of solution generally being suitable. If the concentration is below about 20 grams of iron per liter, the bath resistance becomes so high that it renders the process uneconomical. Concentrations above 50 grams per liter tend to yield dense, non-spongy deposits, but this problem can be alleviated by increasing the current density and reducing the electrolyte temperature. An electrolyte concentration of 40 grams of iron per liter has been found to be particularly effective. Any suitable ferrous salt may be used as the source of ferrous ions, e.g. ferrous chloride and/or ferrous sulfate. A ferrous chloride aqueous solution has been found to be particularly effective. The plating conditions for optimum results may have to be altered depending upon the specific ferrous salt used. It is not necessary to add electrolyte during the electroplating operation, for as previously indicated, it is essential that the concentration of the ferrous ions in the vicinity of the cathodes be reduced during the plating operation in order to obtain a spongy deposit.

Another essential feature of the electrolyte is that it should have a substantially neutral pH. It has been found that the electrolyte pH should be in the range of about 5 to about 7, with a pH ranging from about 5.5 to about 5.8 being particularly preferred. It has been found that a pH below about 5 yields a non-spongy, smooth plate deposit, whereas a pH above about 7 yields a non-spongy, gray powdered deposit. Electrolyte stabilization may be obtained by adding buffering agents in amounts sufficient to provide a suitable electrolyte pH. Of course, the buffering agents should not adversely affect the electrolytic deposition of the iron in the desired spongy form. Since the pH of the electrolyte will decrease during the electroplating operation, the buffering agent should be continuously added during the plating operation. Examples of buffering agents which may be used are sodium borate, boric acid, powdered iron and combinations of these.

As shown in the drawing, the first operation in the process of this invention is the electroplating of the iron on the cathodes in a plating tank. A readily powdered, spongy deposit of iron is electrolytically plated on cathodes from a ferrous chloride electrolyte which is slightly agitated such as by slow stirring during the plating. There are several critical factors which must be accounted for during the electroplating. First, the electrolyte must be maintained at a relatively low temperature. It has been found that suitable spongy iron deposits can be produced with electrolyte temperatures in the range of about 10° C. to about 35° C. with a temperature of about 20° to 25° C. being particularly suitable and practical. In general, better deposits are produced at the lower temperatures, though low temperatures may be difficult to maintain. It has been found that there is an interdependence between the electrolyte temperature and the current density applied to the cathodes. Generally, if the plating operation is carried out within a temperature range of about 10° C. to about 20° C., a cathode current density ranging from about 25 amp./ft.$^2$ to about 35 amp./ft.$^2$ may be used. If higher electrolyte temperatures are employed, up to about 35° C., the current density must be increased up to about 50 amp./ft.$^2$. In order for this process to be commercially feasible, an economic balance must be determined between a practical current density and sufficient cooling equipment to maintain the electrolyte temperature at a suitable value.

The duration of the electroplating operation is not critical and may range from about 2 hours up to about 48 hours. The spongy iron deposit which is produced is unstable and readily oxidizes to red iron ($Fe_2O_3$) if allowed to dry. Therefore, the cathodes should be kept wet until they are heat treated to convert the iron deposit into battery active material.

As previously indicated, the electrolyte should have a substantially neutral pH, which condition results in the formation of insoluble ferrous and ferric hydroxides. While it is not apparent what effect the suspended flocs of these hydroxides have on the spongy iron deposit, it has been determined that a good deposit cannot be obtained until the electrolyte pH is in the range at which these hydroxides form. Unfortunately, the sediment of these hydroxides on the bottom of the plating tank poses a problem, for it must be removed in order to prevent an accumulation which would eventually short the electrodes. The sediment may be removed from the bottom of the plating tank by a rake located therein, and then it may be pumped to a settling tank where it can be separated from the electrolyte.

After the electroplating operation, the cathodes carrying the deposited iron are removed from the plating tank and subjected to a water wash for about ½ to 1 hour in circulating water wash tanks. In this operation, most of the ferrous chloride electrolyte which is carried out of the plating bath on the plated cathodes is removed by washing with water. It is essential to rid the spongy iron deposit of all chloride ions, since they tend to have a detrimental effect on the electrochemical properties of iron active material and also adversely affect the heat treating operation.

The third operation shown in drawing is an alkaline electrolysis. The cathode iron deposit is cathodically electrolyzed in hot, dilute alkaline solution, such as 2% sodium hydroxide solution. A suitable temperature for the alkaline solution ranges from about 60° to about 70° C. This is a further treatment for the removal of ferrous chloride, especially the chloride adsorbed in the pores of the deposit. The ferrous chloride is converted to insoluble ferrous hydroxide and highly soluble sodium chloride. The alkaline cleaning process is further helped by the scrubbing action of the hydrogen bubbles generated by the electrolysis at the cathode. The hydrogen also prevents the iron deposit from oxidizing to ferrous or ferric hydroxide. The alkaline electrolysis is generally continued for about 1 hour, but this is not critical.

After the alkaline cleaning treatment, the cathodes containing the spongy iron deposit are again thoroughly water washed to remove all traces of the alkaline solution and salts formed therein. This second water wash treatment may also be performed in the circulating water wash tank and should be continued for at least about 4 hours, and it may be continued for as much as about 72 hours.

The washed spongy iron deposit must then be dried and converted into battery active material. Iron active material prepared in accordance with this invention generally initially comprises about 50% iron and 50% iron oxide ($Fe_3O_4$), but is readily converted to iron hydroxide in the battery. After the spongy iron deposit is heat treated to convert it into active material, it is stable for further processing. The conditions of this heat treating operation must be carefully controlled, the circulation of air must be restricted, in order to prevent oxidation of the iron to red iron ($Fe_2O_3$) which is not useful as battery active material. It is believed that the desired degree of oxidation is obtained when the spongy iron partially reacts with water vapor to form ferrous hydroxide

$$[Fe + 2H_2O \rightarrow Fe(OH)_2 + H_2]$$

which is then dehydrated at temperatures near 300° C. In order to avoid over oxidation, this heat treatment should be carried out in an air tight chamber, such as that of a muffle-type furnace, and at temperatures of at least about 325° C.

The iron deposit is a relatively soft, readily ground material after the heat treatment. It is then ready for the final grinding operation in which it is removed from the cathodes and reduced in particle size until it conforms to the size and distribution specified for iron battery active material. It has been found that rod-type cathodes can be used for the electroplating, and after the heat treatment, they can be placed directly into a rod mill and the iron deposit removed and ground to proper size in one operation.

The following examples illustrate several runs made in accordance with the electrolytic process of this invention.

*Examples I–VI*

An electrolyte of ferrous chloride was prepared by diluting a stock solution of ferrous chloride, containing about 170 grams of iron per liter, with distilled water to obtain 60 liters of electrolyte having a concentration of about 40 grams of iron per liter. The stock solution was prepared by slowly adding 2500 grams of iron to 15 liters of 50% hydrochloric acid solution, containing about 915 moles of HCl. After the reaction stopped, 20 grams of iron powder were added, and the solution allowed to stand for about 24 hours in order to achieve substantially complete neutralization (pH of at least 5). At all times during the preparation of the stock solution and the dilution of the stock solution, it is desirable to prevent contact of the electrolyte with air, since the electrolyte easily oxidizes. When the electroplating operation was about to start, 60 liters of electrolyte (40 g. Fe/l.) were added to the plating tank.

To carry out the electroplating operation, 8 anodes and 6 cathodes, each cathode comprising 3 rods, were alternately arranged in the plating tank. Prior to placing the electrodes in the plating tank, they were cleaned. The iron anode sheets were scraped and pickled in a solution of one part of conc. HCl to one part water until all scale and rust had been removed and were then rinsed in distilled water. If the anodes are not used immediately, they should again be dipped in HCl and rinsed just prior to using them. The steel cathode rods were wiped with naphtha and then cathodically electrolyzed at 10 amp./ft.$^2$ current density in a conventional alkaline cleaner (sold under the trademark Oakite) until they were easily wet with water. Then the cathodes were water rinsed and air dried, and just before using them, they were given a quick dip in a solution of one part of conc. HCl to one part water and rinsed with distilled water.

The electroplating operation was started and usually continued for about 48 hours. Sodium borate was added to the electrolyte before and during the plating operation in order to maintain the electrolyte pH at 5 or greater. The electrolyte concentration (40 g. Fe/l.) was maintained by adding ferrous chloride stock solution or water before each successive plating operation. The only control necessary during the plating operation was to regulate current and to keep the pH of the electrolyte substantially neutral (at least 5) by periodically adding sodium borate. Immediately after the electroplating operation, the cathodes containing the iron deposit were removed from the plating tank, placed in the circulating water wash tanks and kept there for from about ½ to 1 hour. The cathodes were then put in the alkaline electrolysis tank where they were cathodically electrolyzed at a current density of 10 amp./ft.$^2$ and for 1 hour. The electrolyte was a 2% NaOH solution, and its temperature was maintained between about 60 to 70° C. Subsequently, the cathodes were returned to the water wash tanks where they were kept for from 4 to 24 hours.

The cathodes with the iron deposit were then heat treated at about 350° C. for about 3.5 hours and then allowed to cool at room temperature. It was found that this heat treatment had to be carried out in such a manner that the circulation of air around the hot cathodes was restricted in order to convert the iron deposit into a suitable battery active material. A muffle furnace was used, and the wet cathodes were placed in a retort which was then placed in an oven. The retorts had tubes for escaping steam, but the tubes were small enough so that air circulation was restricted. After the heat treatment, the rod-like cathodes were placed in a rod mill where they were milled until the iron deposit was removed from the rods and the powdered iron passed a standard screen test. The screen test comprised placing a 10 gram portion of the ground iron deposit which had passed through a U.S. Standard Sieve No. 30 on the top screen of a Tyler screen set and then shaking the sample for 10 minutes on a screen shaker. The specification for the weight of material on each screen was as follows:

| Mesh No.: | Wt., percent |
|---|---|
| On 35 | 0–1.2 |
| On 48 | 1–4 |
| On 65 | 4–7.5 |
| On 100 | 7–11.5 |
| On 150 | 9–12 |
| Through 150 | 65–78 |

The following table indicates conditions and results in 6 examples:

| Example No. | 1 | 2 | 3 | 4 | 5 | 6 |
|---|---|---|---|---|---|---|
| Electrical Data (Plating): | | | | | | |
| Hrs. of Run | 48.0 | 24.0 | 16.0 | 48.0 | 48.0 | 22.5 |
| Avg. Amp | 45.0 | 30.0 | 45.0 | 45.0 | 45.0 | 90.0 |
| Amp. Hr. Input | 2,160 | 720 | 720 | 2,160 | 2,160 | 2,025 |
| Theor. g. Iron | 2,248.6 | 749.5 | 749.5 | 2,248.6 | 2,248.6 | |
| Volt Tank (avg.) | 1.7 | 1.9 | 2.4 | 1.70 | 1.45 | 2.20 |
| M-G. Volt | 3.0 | 3.0 | 3.9 | 3.0 | 3.0 | |
| Electrolyte (FeCl$_2$): | | | | | | |
| Temp., ° C. (Max.) | 28.5 | 36.0 | 37.0 | 15.0 | 35.0 | 51.0 |
| pH (Avg. range) | 5.3–5.6 | 5.0–5.6 | 5.3–6.2 | 5.1–5.4 | 5.4–5.9 | 5.0–5.3 |
| Sp. Gr. (Room Temp.) | 1,075 | 1,077 | 1,076 | 1,078 | 1,040 | 1,078 |
| Grams Fe/l. (Approx.) | 39 | 40 | 39 | 40 | 20 | 40 |
| Addition Agent | AA | AA | AA | AA | [2] AA | AA |
| Rate of Flow, Liter/Min | 0.42 | 0.25 | 0.25 | 0.25 | 0.25 | 0.25 |
| Current Density: | | | | | | |
| Cathode, amp./ft.$^2$ | 32.6 | 65.2 | 97.8 | 32.6 | 32.6 | 65.2 |
| Anode, amp./ft.$^2$ | 20.0 | | | 20.0 | 20.0 | |
| X Normal C.D. | N | 2N | 3N | N | N | 2N |
| Anodes: Weight loss, g | 2,419.2 | 790.0 | 781.2 | 2,321.6 | 2,314.3 | |
| Cathode Deposit: | | | | | | |
| Wt. in Grams | 2,381.8 | 821.6 | 760.9 | 2,520.0 | | [3] |
| Percent Fe total | 92.24 | 91.68 | 89.85 | 89.16 | 92.34 | [3] |
| Grams Fe | 2,197.0 | 753.2 | 683.70 | 2,246.8 | | [3] |
| Percent Met. Fe | 65.86 | 63.34 | 55.12 | 52.03 | 70.35 | [3] |
| Percent FeO | 33.94 | 36.46 | 44.68 | 44.77 | 29.45 | [3] |
| Percent Mn | 0.0013 | 0.004 | 0.003 | 0.006 | 0.001 | [3] |
| Percent S | 0.011 | 0.015 | 0.016 | 0.009 | 0.008 | [3] |
| Bulk Weight, g./cm.$^3$ | 19.1 | 21.0 | 20.1 | 22.9 | 39.3 | [3] |
| Efficiency: Cathode Eff., Percent | 97.7 | 100+ | 91.2 | 99.9 | | [3] |

[1] Addition agent, sodium borate, 3 g./l.
[2] 12+ g. NH$_4$Cl/l.
[3] Poor deposit; not completed.

The results of these 6 examples illustrate several interesting features of the process of this invention. Example 1 shows that a soft, spongy deposit can be obtained at a cathode current density of 32.6 amp./ft.$^2$ and an electrolyte temperature of about 30° C. Examples 2 and 3 indicate that a suitable deposit can be prepared at higher electrolyte temperatures if the cathode current density is increased. Example 4 demonstrates that particularly good results can be obtained at lower electrolyte temperatures such as 15° C.

In Example 5, an attempt was made to obtain a good cathode deposit at a relatively high electrolyte temperature (35° C.) and normal cathode current density (32.6 amp./ft.$^2$) by decreasing the iron concentration to 20 g./l. and adding ammonium chloride to the electrolyte to compensate for its lowered conductivity. The deposit was satisfactory though not as good as deposits at lower temperatures. Example 6 indicates that at an electrolyte temperature of 51° C., the deposit is unsatisfactory even when using a high cathode current density.

The iron active materials produced in Examples 2, 3 and 4 were tested for their electrical capacity in miniature cells and were compared to a standard commercial iron active material.

| | Electrical Capacity, M.A.H. (Avg. of 2 values) | | | | | | |
|---|---|---|---|---|---|---|---|
| Cycle No | 1 | 6 | | 8 | 14 | | 16 |
| Charge (MA for 7 hrs.) | 500 | 750 | | 500 | 750 | | 500 |
| Discharge Rate, MA | 400 | 750 | | 400 | 750 | | 400 |
| End Voltage | 1.0 | 1.0 | 0.5 | 1.0 | 1.0 | 0.5 | 1.0 |
| Standard | 2,410 | 1,475 | 2,337 | 2,120 | 1,550 | 2,381 | 2,287 |
| Example 2 | 2,300 | 1,325 | 2,081 | 1,880 | 1,556 | 2,306 | 2,157 |
| Example 3 | 2,440 | 1,319 | 2,163 | 1,864 | 1,575 | 2,444 | 2,177 |
| Example 4 | 2,110 | 1,356 | 2,356 | 1,964 | 1,600 | 2,588 | 2,330 |

These results indicate that the iron active material electrolytically produced in Examples 2, 3 and 4 had satisfactory electrical capacity.

Having completely described this invention, what is claimed is:

1. An electrolytic process for producing iron active material for electric storage batteries which comprises:
   (a) preparing an electrolyte containing ferrous ions having a pH in the range of about 5 to about 7 and an iron concentration in the range of about 20 to about 50 grams per liter, said electrolyte containing sufficient buffering agent to maintain the pH in the range of about 5 to about 7;
   (b) inserting anodes and cathodes in said electrolyte, the anodes consisting essentially of iron;
   (c) electroplating iron on said cathodes at a cathode current density in the range of about 25 to about 50 amp./ft.$^2$ and maintaining said electrolyte at a temperature ranging from about 10° C. to about 35° C.;
   (d) after completing the electroplating operation, passing the cathodes containing the electroplated iron into a water wash to remove the electrolyte therefrom;
   (e) placing the washed cathodes and iron deposit in a dilute alkaline solution and cathodically electrolyzing the iron deposit therein;
   (f) again washing the cathodes and iron deposit to remove the alkaline solution and salts formed therein;
   (g) subjecting the cathodes containing the iron deposit to a heat treatment to convert a portion of the iron to $Fe_3O_4$ and in which the circulation of air is restricted in order to prevent the oxidation of the iron to red iron; and
   (h) removing and grinding the converted iron deposit to the proper size by placing the cathodes containing the deposited iron in a grinding mill.

2. An electrolytic process for producing iron active material for electric storage batteries which comprises:
   (a) preparing a ferrous chloride electrolyte having a pH in the range of about 5 to about 7 and an iron concentration in the range of about 20 to 50 grams per liter, said electrolyte containing sufficient buffering agent to maintain the pH in the range of about 5 to about 7;
   (b) inserting anodes and cathodes in said electrolyte, the anodes consisting essentially of iron;
   (c) electroplating iron on said cathodes at a cathode current density in the range of about 25 to about 50 amp./ft.$^2$ and maintaining said electrolyte at a temperature ranging from about 10° C. to about 35° C.;
   (d) after completing the electroplating operation, passing the cathodes containing the electroplated iron into a water wash to remove the electrolyte therefrom;
   (e) placing the washed cathodes and iron deposit in a dilute alkaline solution and cathodically electrolyzing the iron deposit therein;
   (f) again washing the cathodes and iron deposit to remove the alkaline solution and salts formed therein;
   (g) subjecting the cathodes containing the iron deposit to a heat treatment to convert a portion of the iron to $Fe_3O_4$ and in which the circulation of air is restricted in order to prevent the oxidation of the iron to red iron; and
   (h) removing and grinding the converted iron deposit to the proper size by placing the cathodes containing the deposited iron in a grinding mill.

3. An electrolytic process in accordance with claim 2 in which the electrolyte has a pH in the range of about 5.5 to about 5.8.

4. An electrolytic process in accordance with claim 2 in which the electrolyte has an iron concentration of about 40 grams of iron per liter.

5. An electrolytic process in accordance with claim 2 in which the cathode current density ranges from about 25 to about 35 amp./ft.$^2$ and the electrolyte is maintained at a temperature ranging from about 10° C. to about 20° C.

6. An electrolytic process for producing iron active material for electric storage batteries which comprises:
   (a) preparing a ferrous chloride electrolyte having a pH in the range of about 5.5 to about 5.8 and an iron concentration of about 40 grams per liter, said electrolyte containing from about 3 to about 6 grams per liter of a buffering agent;
   (b) inserting anodes and cathodes in said electrolyte, the anodes consisting essentially of iron;
   (c) electroplating iron on said cathodes at a cathode density in the range of about 25 to about 35 amp./ft.$^2$ and maintaining said electrolyte at a temperature ranging from about 10° C. to about 20° C.;
   (d) after completing the electroplating operation, passing the cathodes containing the electroplated iron into a water wash to remove the electrolyte therefrom;
   (e) placing the washed cathodes and iron deposit in a dilute alkaline solution and cathodically electrolyzing the iron deposit therein;
   (f) again washing the cathodes and iron deposit to remove the alkaline solution and salts formed therein;
   (g) subjecting the cathodes containing the iron deposit to a heat treatment to convert about half of the iron to $Fe_3O_4$ and in which the circulation of air is restricted in order to prevent the oxidation of the iron to red iron;
   (h) removing and grinding the converted iron deposit to the proper size by placing the cathodes containing the deposited iron in a grinding mill.

References Cited

UNITED STATES PATENTS

| | | | |
|---|---|---|---|
| 1,740,518 | 12/1929 | Miller. | |
| 1,942,791 | 1/1934 | Ackermann. | |
| 2,538,991 | 1/1951 | Trask | 204—48 X |
| 2,745,800 | 5/1956 | Poor | 204—48 |
| 3,091,580 | 5/1963 | Shapiro et al. | 204—56 X |
| 3,108,909 | 10/1963 | Stanimirovitch | 136—6 |

OTHER REFERENCES

Metal Finishing Guidebook, 30th edition, 1962, page 324.

Grant: Hackh's Chemical Dictionary, 3rd edition, 1944, page 146.

WINSTON A. DOUGLAS, *Primary Examiner.*

B. J. OHLENDORF, A. SKAPARS, *Assistant Examiners.*